United States Patent [19]

Hall

[11] 4,298,951

[45] Nov. 3, 1981

[54] NTH ROOT PROCESSING APPARATUS

[75] Inventor: Stanley R. Hall, Westlake Village, Calif.

[73] Assignee: Bunker Ramo Corporation, Oak Brook, Ill.

[21] Appl. No.: 99,201

[22] Filed: Nov. 30, 1979

[51] Int. Cl.³ .............................................. G06F 7/552
[52] U.S. Cl. ..................................................... 364/752
[58] Field of Search ...................... 364/752, 753, 814; 328/144

[56] References Cited

U.S. PATENT DOCUMENTS 3,610,904 10/1971 Kumagai ............................. 364/752
3,906,210 9/1975 Mignot .................................. 364/752

OTHER PUBLICATIONS

R. K. Kirkman, "Numeric Value Determination", *IBM Technical Disclosure Bulletin*, vol. 20, No. 5, Oct. 1977, pp. 1913–1915.

*Primary Examiner*—Jerry Smith
*Attorney, Agent, or Firm*—F. M. Arbuckle; A. Freilich; N. A. Camasto

[57] ABSTRACT

A square root processing apparatus wherein an unknown number is sequentially squared and compared to a number whose square root is to be determined. The result of each comparison determines the state of a bit in the square root being determined. More specifically, the square root processor includes a Y register containing a number whose square root is to be determined, and an X register which is used to develop the square root of the contents of the Y register. The apparatus provides a means for initially setting the most significant bit stage of the X register to one, the remaining bit stages containing zeros. The contents of the X register are then squared by a high speed digital multiplier and compared with the contents of the Y register. If the squared number is greater than the contents of the Y register, the most significant bit stage of the X register is reset to zero. The apparatus then sets the next most significant bit stage of the X register to one and repeats the above-described sequence. The apparatus provides a means for repeating this process until all bit stages in the X register have been tested and determined, the contents of the X register then defining the square root of the number contained in the Y register.

7 Claims, 3 Drawing Figures

NTH ROOT PROCESSING APPARATUS

BACKGROUND OF THE INVENTION

The invention relates to apparatus for determining the Nth root of a number.

Special signal processing often requires the very rapid computation of the square root or the Nth root of a binary number. With the advent of customized read-only memories, it has become routine to address the read-only memory with the number for which the suare root or Nth root is to be obtained, the root being stored as the memory content. However, as the size of the number whose Nth root is to be determined increases, or the accuracy to which the Nth root is to be determined, the complexity of the hardware required increases due to many more memory storage locations and a larger number of possible addresses required. For example, each bit added to the word length of a number whose square root is to be determined causes the number of address combinations to double. This increase in complexity increases the cost of the Nth root processor, thereby adding to the overall costs of signal processing. The invention solves the above problems by providing a simplified and highly accurate Nth root processor.

SUMMARY OF THE INVENTION

A special purpose processor is provided in accordance with the invention for determining the Nth root of a binary number Y. The processor includes a memory register having a plurality of bit stages whose contents are to define the Nth root of Y. With all memory register stages initially reset to zero, the bit stages are addressed in sequence, from most to least significant, and are set to one. A means for raising the binary number contained in the memory register to the Nth power, and a comparison means for determining if the raised number is greater than the binary number Y are also provided. A resetting means responsive to the comparison means causes the bit stage last set to a one to be reset to zero if the raised number is greater than the binary number Y. The contents of the memory register after each of the bit stages has been set to one and then configured according to the resetting means then defines the Nth root of the binary number (Y).

In accordance with an important aspect of the invention, the means for raising the number in the memory register to the Nth power includes a high speed digital multiplier connected in a closed loop together with the memory register and a binary comparison means.

In a specific embodiment for a square root processor, the most significant bit stage in the memory register is first set to one. The contents of the memory register are then concurrently applied to both inputs of a high speed digital multiplier. The product produced by the multiplier is then compared with a binary number (Y) whose square root is to be determined. If the product is greater than the binary number (Y), the invention provides a means for resetting the most recently set bit stage to zero, prior to setting the next most significant bit stage to one. The memory contents are again applied to the multiplier, the product compared, and if larger than the number to be determined (Y), the addressed next bit stage is then reset to zero; otherwise it remains a one and the next most significant bit stage is addressed. This process is repeated until all of the bit stages defining the root to be determined have been addressed and tested, the contents of the memory register then defining the square root of the number to be determined (Y).

DETAILED DESCRIPTION

A detailed illustrative embodiment of the invention disclosed herein exemplifies the invention and is currently considered to be the best embodiment for such purposes. However, it will be apparent to those skilled in the art that changes and modifications may be made wihout departing from the invention in its broader aspects. Accordingly, the specific embodiment disclosed is only representative in providing a basis for the claims which define the scope of the present invention.

As previously explained, the exemplary embodiment provides a square root processor utilizing a high speed digital multiplier which allows the square root of a binary number to be determined with a speed and simplicity heretofor unachieved by conventional square root processors. A Y register contains the binary number whose square root is to be determined. An X register, which is to contain a binary number corresponding to the square root of the contents of the Y register, is configured so that a bit stage corresponding to the most significant bit is initially set to a one, the remaining locations being set to zero. The contents of the X register are then squared by a high speed digital multiplier and compared with the contents of the Y register. If the comparison shows that the output of the high speed digital multiplier is greater than the contents of the Y register, the bit stage corresponding to the most significant bit is reset to a zero and the bit stage corresponding to the next most significant bit addressed and set to a one. This process is sequentially repeated until all of the bits in the X register bit stages have been tested. At this time, the contents of the X register correspond to the square root of the number contained in the Y register. The accuracy of the X register contents is only limited by the number of bit stages contained therein.

Figure 1:
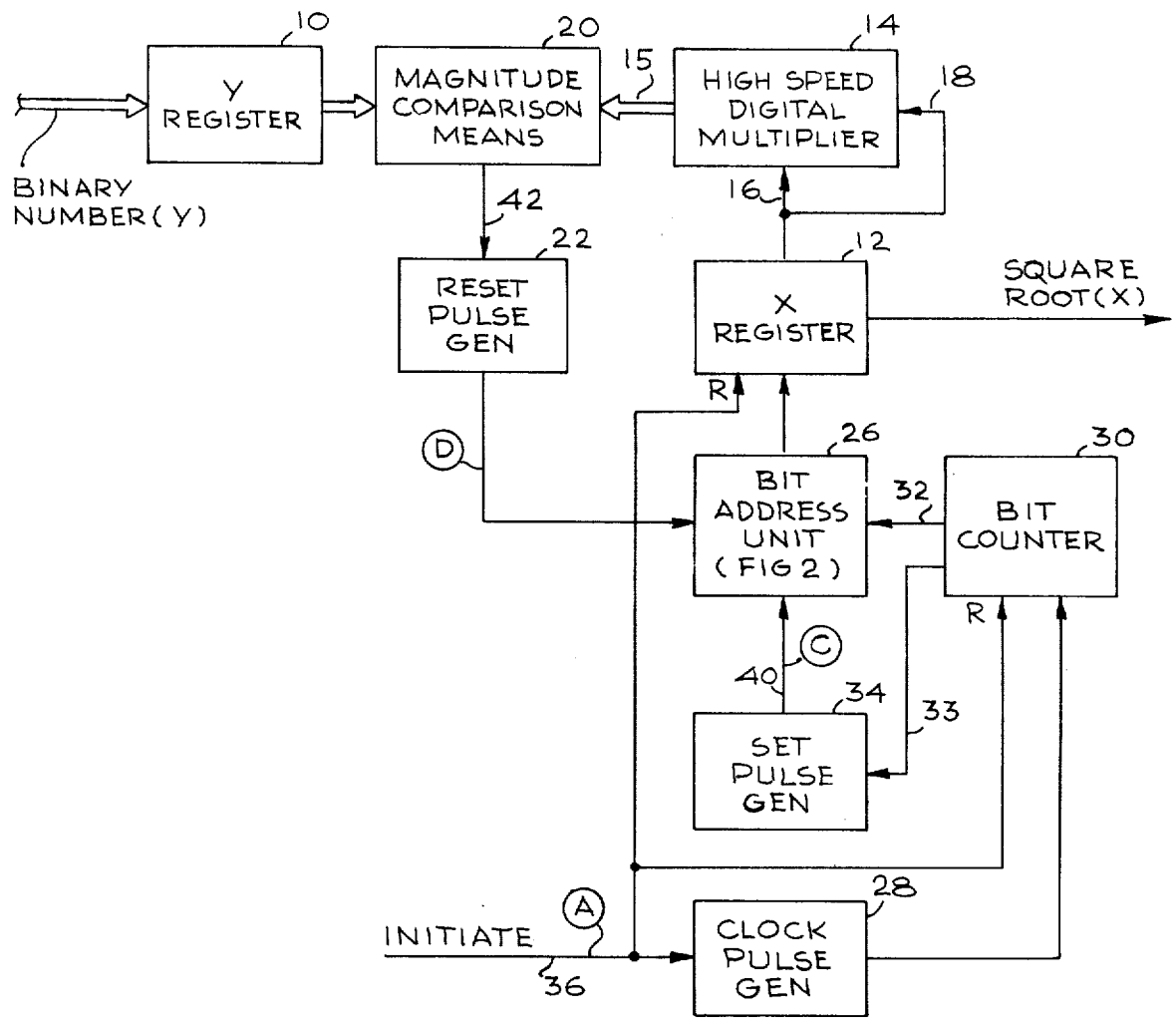
FIG. 1 is a block diagram of a square processor provided by the invention.

Referring now to FIG. 1, a Y register 10 is chosen to contain a binary number Y whose square root is to be determined. An X register 12 is chosen to have a plurality of bit stages, the state of each bit stage to be determined in accordance with the square root of the number contained in the Y register 10. A high speed digital multiplier 14 is provided, its two inputs comprising a multiplier input on lines 16 and a multiplicand input on input lines 18, both inputs comprising the same output from the X register 12. An example of a high speed digital multiplier which could be utilized is the MTY-8AJ manufactured by TRW. The high speed digital multiplier 14 thus provides an output on product output terminals 15 which correspond to a square of a number defined by the contents of the bit stages in the X register 12. Magnitude comparison means 20 compare the contents of the Y register 10 and the output of the high speed digital multiplier 14. The comparison means 20 are chosen so that a signal is provided to a reset pulse generator 22 whenever the output from the high speed digital multiplier 14 defines a number greater than the number Y contained in the Y register 10. A bit address unit 26 is chosen so that it sequentially addresses in descending order each bit stage in the X register 12 beginning with the bit stage corresponding to the most significant bit of the digital number contained therein. A clock pulse generator 28 provides clock pulses to a bit counter 30 which in turn provides indexing signals 32 to the bit address unit 26 and a set signal 33 to a set pulse generator 34. Each indexing signal corresponds to a predetermined plurality of clock pulses, and the set signal 33 is provided during each indexing signal. The bit address unit 26 is chosen to address a bit stage in the X register 12 corresponding to the next most significant bit whenever an indexing signal 32 is provided by the bit counter 30. The set pulse generator 34 provides a set pulse to the bit address unit 26 each time the set signal 33 is received. The bit stage in the X register 12 addressed by the bit address unit 26 will be set to a one by a set pulse from the set pulse generator 34, and to a zero by a pulse from the reset pulse generator 22. A signal on an initiate line 36 activates the clock pulse generator 28 and resets the bit counter 30 and all bit stages in the X register 12. The bit counter 30 then provides an indexing signal to the bit address unit 26 which corresponds to the bit stage in the X register corresponding to the most significant bit.

Figure 2:
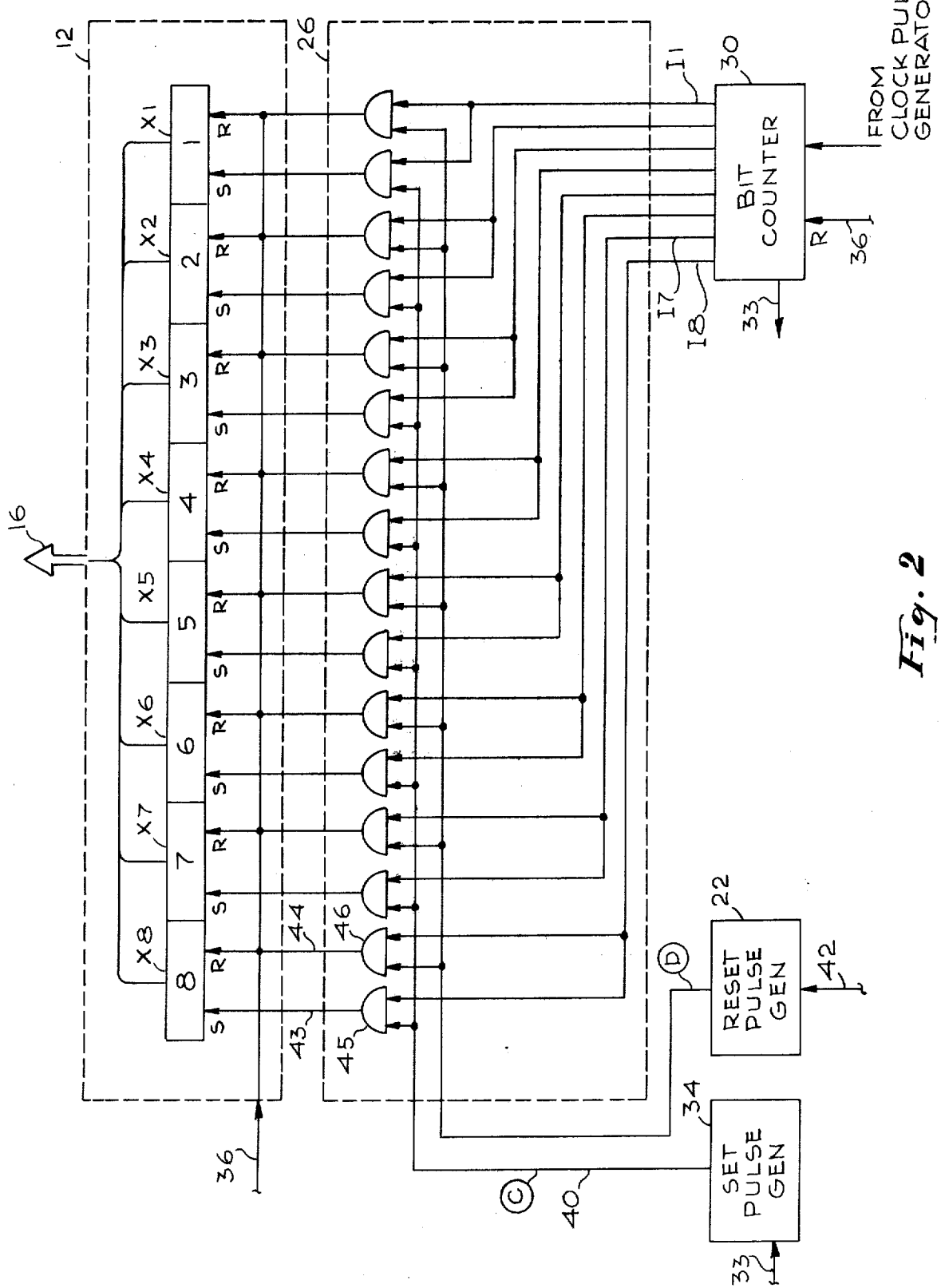
FIG. 2 is a logic diagram of the bit address unit shown in FIG. 1.

Referring to FIG. 2, the X register 12 contains a plurality of bit stages X1–X8, each of which can contain a one or zero in accordance with the number to be determined. Referring to the bit stage X8 corresponding to the most significant bit of the number to be determined for exemplary purposes, a set line 43 and a reset line 44 are provided. The set line 43 is connected to the output of a setting gate 45 in the bit address unit 26, and the reset line 44 is connected to the output of a resetting gate 46 in the bit address unit 26. In response to the initiation pulse on line 36, bit counter 30 and X register stages X1–X8 are all reset so that a first indexing signal corresponding to bit stage X8 is provided on an indexing line I8. During the time that the first indexing signal is high, a set pulse on line 40 causes bit stage X8 to be set high. Then, as previously explained, if a reset pulse from the reset pulse generator 22 is generated, bit stage X8 will be reset to zero. The first indexing signal on indexing line I8 then becomes low, and a second indexing signal on line I7 becomes high. The above-described sequence is then repeated. The bit counter 30 sequentially causes each indexing line I to become high, thereby allowing its corresponding bit stage X to be set and then reset if appropriate.

Figure 3:
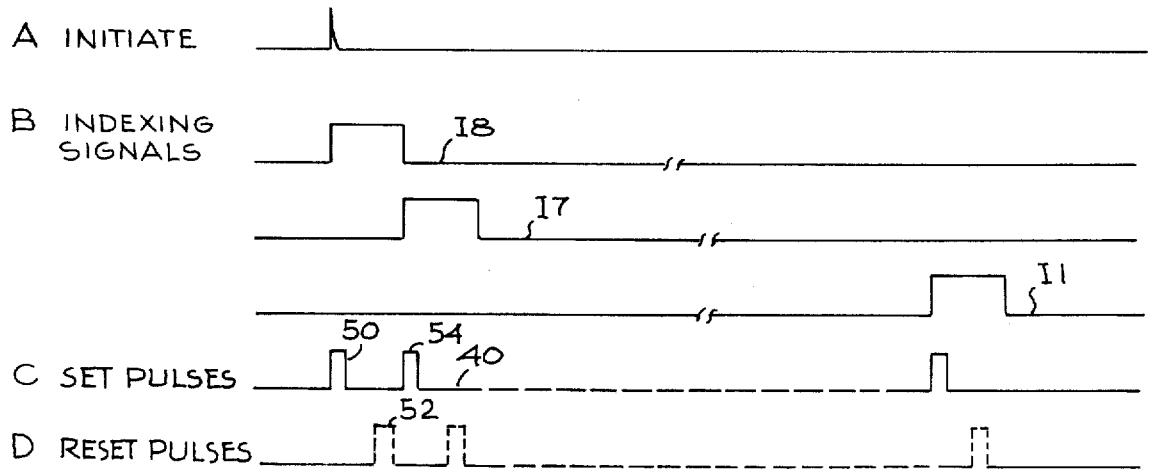
FIG. 3 are waveform diagrams at various points in FIGS. 1 and 2.

In operation, a binary number Y is set into the Y register 10, the contents of which are automatically transferred to one of the comparison means 20. Referring to the waveform diagrams of FIG. 3 in conjunction with the block and logic diagrams of FIGS. 1 and 2, an initiation signal on the initiate line 36 as shown in Waveform A resets each of the bit stages X1–X8 in the X register 12 and resets the bit counter 30 so that it first provides an indexing signal on the indexing line I8 corresponding to the bit stage containing the most significant bit. The indexing signal on line I8 is shown at I8 in FIG. 3. During the time that I8 is high, the set signal 33 from the bit counter 30 causes the set pulse generator 34 to generate a set pulse on line 40, as shown in Waveform C at 50, this pulse causing bit stage X8 to be set. The high speed digital multiplier 14 which is chosen to continuously square the contents of the X register 12 provides a binary number corresponding to the square of the contents of the X register to the other of the comparison means 20. If the comparison means 20 show that the output of the high speed digital multiplier 14 defines a number greater than that stored in the Y register 10, a high signal is provided on line 42 to the reset pulse generator 22. The reset pulse generator 22 then provides a high signal to the resetting gate 46 as shown in Waveform D at 52. Since the signal on indexing line I8 is also high at this time, bit stage X8 will be reset. On the other hand, if the contents of the Y register 10 are greater than or equal to the output of the high speed digital multiplier 14, then line 42 will not be high and thus the reset pulse generator 22 will not provide an output to reset bit stage X8.

The next indexing signal on line I7 from the bit counter 30 in conjunction with a set pulse from the set generator 34 as shown in Waveform C at 54 causes the next bit stage X7 in the X register 12 to be set, this bit stage containing the next most significant bit of the number to be determined. The high speed digital multiplier 14, which is continually multiplying, then provides an output corresponding to the number defined by the first and second most significant bits of the number contained in the X register 12, the remaining bit stages still being set to zero as previously explained. The comparison process within the comparison means 20 is then repeated, the reset pulse generator 22 again generating a reset pulse if the output of the high speed digital multiplier is greater than the contents of the Y register 10 as previously explained. The above described process is continuously repeated until all bit stages within the X register have been addressed. At this time, the number defined the X register 12 corresponds to the square root of the number contained in the Y register 10.

Although the above described embodiment is discussed in terms of determining a square root, the Nth root of a number can also be determined, the only difference being the number of high speed digital multipliers utilized. For example, the cube root of a number (i.e., N=3) could be determined by connecting both inputs of a first high speed digital multiplier to the output of the X register as shown in the exemplary embodiment, and then connecting a second high speed digital multiplier so that one input is provided by the X register and the other input provided by the output of the first high speed digital multiplier. The output of the second high speed digital multiplier is then provided to the comparison registers. Also, it should be appreciated that although the exemplary embodiment is described in terms of ones and zeros, a one should be interpreted as defining a first state, and a zero should be interpreted as defining a second state.

Thus it should now be apparent that a Nth root processor has been described wherein a Nth root can be determined in accordance with the speed of a high speed digital multiplier. Thus extremely rapid calculations of Nth roots of an unknown number can be accurately, cheaply and rapidly attained with the processor provided by the invention.

What is claimed is:

1. A processor for determining the square root of a predetermined multibit binary number (Y) comprising:
    a first register comprised of multiple bit stages for storing said binary number (Y);
    a second register comprised of multiple bit stages including a most significant bit stage and stages of successively lesser significance including a least significant bit stage;

a high speed digital multiplier having multiplier input terminals, multiplicand input terminals and product output terminals and including means responsive to the application of signals representative of first and second binary numbers to said multiplier and multiplicand input terminals respectively for producing binary signals representative of the product of said first and second binary numbers on said product output terminals;

means connecting said second register to both the multiplier and multiplicand input terminals of said multiplier;

magnitude comparison means having first and second input terminals and an output terminal, and including means for developing a first output signal on said output terminal if a number applied to said first input terminal exceeds a number applied to said second input terminal and a second output signal on said output terminal if a number applied to said second input terminal exceeds a number applied to said first input terminal;

means respectively connecting said first register and said multiplier product output terminals to said comparison means first and second input terminal;

initializing means for initially writing a binary zero to each stage of said second register;

addressing means for addressing said stages of said second register sequentially from said most to said least significant bit stage to write a binary one in each stage;

a clock pulse generator;

a bit counter responsive to said clock pulse generator for generating indexing signals; and means responsive to said indexing signals and said first output signal on said comparison means output terminal for incrementing said addressing means to address a succeeding stage and responsive to said second output signal on said magnitude comparison means output terminal for writing a binary zero into the addressed stage of said second register prior to addressing a succeeding stage.

2. A processor for determining the square root of a predetermined binary number (Y) comprising:

a memory register having a plurality of bit stages each of which corresponds to a bit of a binary number to be determined (X);

setting means for successively setting each of said bit stages to a one beginning with the bit state corresponding to the most significant bit of said number to be determined (X) and ending with the bit stage corresponding to the least significant bit of said number to be determined (X), said setting means comprising:

a bit address means for sequentially addressing in a predetermined order each of said memory register bit stages; and a set generator for providing a set signal at predetermined intervals to said bit address means, said set signal causing said addressed bit stage to be set to a one;

a clock pulse generator;

a bit counter responsive to said clock pulse generator for generating indexing signals for causing said bit address means to address the next of said bit stages in accordance with said predetermined order;

multiplication means for squaring the binary number defined by the contents of said memory register bit stages each time one of said bit stages is set to one;

comparing means responsive to the squared binary number provided by said multiplication means and said predetermined binary number (Y); and resetting means responsive to said comparing means for resetting said bit stage last set to zero if the squared binary number provided by said multiplication means is greater than said predetermined binary number (Y) whereby each of said memory register bit stages is sequentially set to a one and then reset, if necessary, by said resetting means, the contents of said memory register thus defining the square root of said predetermined binary number (Y) after the bit stage corresponding to the least significant bit of said number to be determined has been set and then reset, if necessary.

3. The processor of claim 2 wherein said bit counter is further responsive to said clock pulse generator for generating a signal for causing said set generator to provide a set signal.

4. The processor of claim 2 wherein said multiplication means comprises a high speed digital multiplier.

5. The processor of claim 2 wherein said resetting means comprises:

a reset pulse generator for generating a reset pulse each time the squared binary number provided by said multiplication means is greater than said predetermined binary number (Y); and means for providing said reset pulse to said bit address means thereby resetting to zero said addressed bit stage.

6. A process for determining N roots of a binary number (Y) comprising:

a memory register having a plurality of bit stages the contents of which are to define a number to be determined (X);

a bit address means for sequentially addressing in a predetermined order each of said memory register bit stages;

a set generator for providing a set signal at predetermined intervals to said bit address means, said set signal causing said addressed bit stage to be set to a one;

a clock pulse generator;

a bit counter responsive to said clock pulse generator for generating indexing signals for causing said bit address means to address the next of said bit stages in accordance with said predetermined order;

means for raising the binary number defined by the contents of said bit stages to the Nth power;

comparison means for determining if said raised number is greater than said binary number (Y); and resetting means responsive to said comparison means for storing a zero in the bit stage last set to a "one" if said raised number is greater than said binary number (Y), the contents of said memory register after each of said bit stages has been set to one and then configured according to said resetting means defining the Nth root of said binary number (Y).

7. The processor of claim 6 in which N equals 2, said means for raising comprises multiplication means for squaring the binary number defined by the contents of said memory register bit stages each time one of said bit stages is set to one.

* * * * *